US009969365B2

(12) United States Patent
Harter

(10) Patent No.: US 9,969,365 B2
(45) Date of Patent: May 15, 2018

(54) CARWASH WITH SMARTPHONE PROXIMITY DETECTION

(71) Applicant: Robert J. Harter, La Crosse, WI (US)

(72) Inventor: Robert J. Harter, La Crosse, WI (US)

(*) Notice: Subject to any disclaimer, the term of this patent is extended or adjusted under 35 U.S.C. 154(b) by 257 days.

(21) Appl. No.: 14/742,745

(22) Filed: Jun. 18, 2015

(65) Prior Publication Data
US 2015/0289105 A1 Oct. 8, 2015

Related U.S. Application Data

(62) Division of application No. 13/492,848, filed on Jun. 9, 2012, now Pat. No. 9,117,233.

(51) Int. Cl.
*G06Q 20/00* (2012.01)
*B60S 3/04* (2006.01)
*H04W 4/02* (2018.01)
*G06Q 30/06* (2012.01)
*B08B 3/04* (2006.01)
(Continued)

(52) U.S. Cl.
CPC ............... *B60S 3/04* (2013.01); *B08B 3/04* (2013.01); *G05B 15/02* (2013.01); *G06Q 20/14* (2013.01); *G06Q 20/145* (2013.01); *G06Q 20/202* (2013.01); *G06Q 20/206* (2013.01); *G06Q 20/322* (2013.01); *G06Q 20/3224* (2013.01); *G06Q 20/3274* (2013.01); *G06Q 20/3276* (2013.01); *G06Q 20/4014* (2013.01); *G06Q 30/0601* (2013.01); *G07F 17/20* (2013.01); *H04W 4/008* (2013.01); *H04W 4/02* (2013.01); *H04W 4/023* (2013.01); *H04W 4/025* (2013.01); *H04W 4/22* (2013.01); *H04W 12/06* (2013.01)

(58) Field of Classification Search
CPC ........ G06Q 30/00; G06Q 20/32; G06Q 30/02; G06Q 20/14; B08B 3/04
USPC .................................................. 705/14.1, 21
See application file for complete search history.

(56) References Cited

U.S. PATENT DOCUMENTS 6,389,337 B1  5/2002 Kolls
6,402,030 B1  6/2002 Summers et al.
(Continued)

OTHER PUBLICATIONS

Need a Carwash?; There's an App for That; 1 page; Virgo Publishing; Jul. 7, 2010; http://www.moderncarcare.com.
(Continued)

*Primary Examiner* — Rokib Masud
(74) *Attorney, Agent, or Firm* — bobharter.com; Robert J. Harter

(57) ABSTRACT

An example carwash method involves a customer using a smartphone with an app for finding participating carwash locations, making online payments for select carwash options, and then using the smartphone app to start the washing process when the customer arrives at the carwash. Various means can be used for determining when the vehicle is at the carwash entrance. Examples of such means include, but are not limited to, reading the GPS coordinates of the smartphone in the vehicle; establishing Bluetooth, WiFi or some other limited-range wireless communication link between the smartphone and the local carwash controller; displaying and manually entering a code or password at the carwash; and scanning a QR code displayed on the smartphone. During the carwash operation, in some examples, the smartphone app provides the customer with an emergency stop option.

6 Claims, 10 Drawing Sheets

(51) Int. Cl.
   *G05B 15/02* (2006.01)
   *H04W 4/00* (2018.01)
   *G06Q 20/14* (2012.01)
   *G06Q 20/20* (2012.01)
   *G06Q 20/32* (2012.01)
   *G06Q 20/40* (2012.01)
   *G07F 17/20* (2006.01)
   *H04W 4/22* (2009.01)
   *H04W 12/06* (2009.01)

(56) References Cited

U.S. PATENT DOCUMENTS

| | | | |
|---|---|---|---|
| 6,574,603 | B1 | 6/2003 | Dickson et al. |
| 6,615,186 | B1 | 9/2003 | Kolls |
| 6,856,820 | B1 | 2/2005 | Kolls |
| 6,912,503 | B1 | 6/2005 | Quarendon et al. |
| 6,968,325 | B2 | 11/2005 | Smith |
| 7,003,289 | B1 | 2/2006 | Kolls |
| 7,201,315 | B2 | 4/2007 | Symonds et al. |
| 7,379,897 | B2 | 5/2008 | Pinkus |
| 7,565,307 | B1 | 7/2009 | Pinkus |
| 7,637,365 | B2 | 12/2009 | Ringdahl et al. |
| 7,676,435 | B1 | 3/2010 | Berstis |
| 7,778,600 | B2 | 8/2010 | Godwin et al. |
| 8,583,511 | B2* | 11/2013 | Hendrickson ......... G06Q 30/02 701/2 |
| 2003/0196688 | A1* | 10/2003 | Yang ..................... B60S 3/04 134/57 R |
| 2007/0022020 | A1 | 1/2007 | Bernstein |
| 2007/0034235 | A1 | 2/2007 | Weyandt et al. |
| 2008/0215505 | A1 | 9/2008 | Reynolds |
| 2010/0012715 | A1* | 1/2010 | Williams ............... G06Q 20/32 235/375 |
| 2011/0238581 | A1 | 9/2011 | Severson et al. |
| 2012/0166240 | A1 | 6/2012 | Jones et al. |
| 2012/0310713 | A1* | 12/2012 | Mercuri ............. G06Q 30/0201 705/14.1 |
| 2013/0073473 | A1 | 3/2013 | Heath |

OTHER PUBLICATIONS

Non-Final Office Action for U.S. Appl. No. 13/492,848; dated Sep. 30, 2014.

* cited by examiner

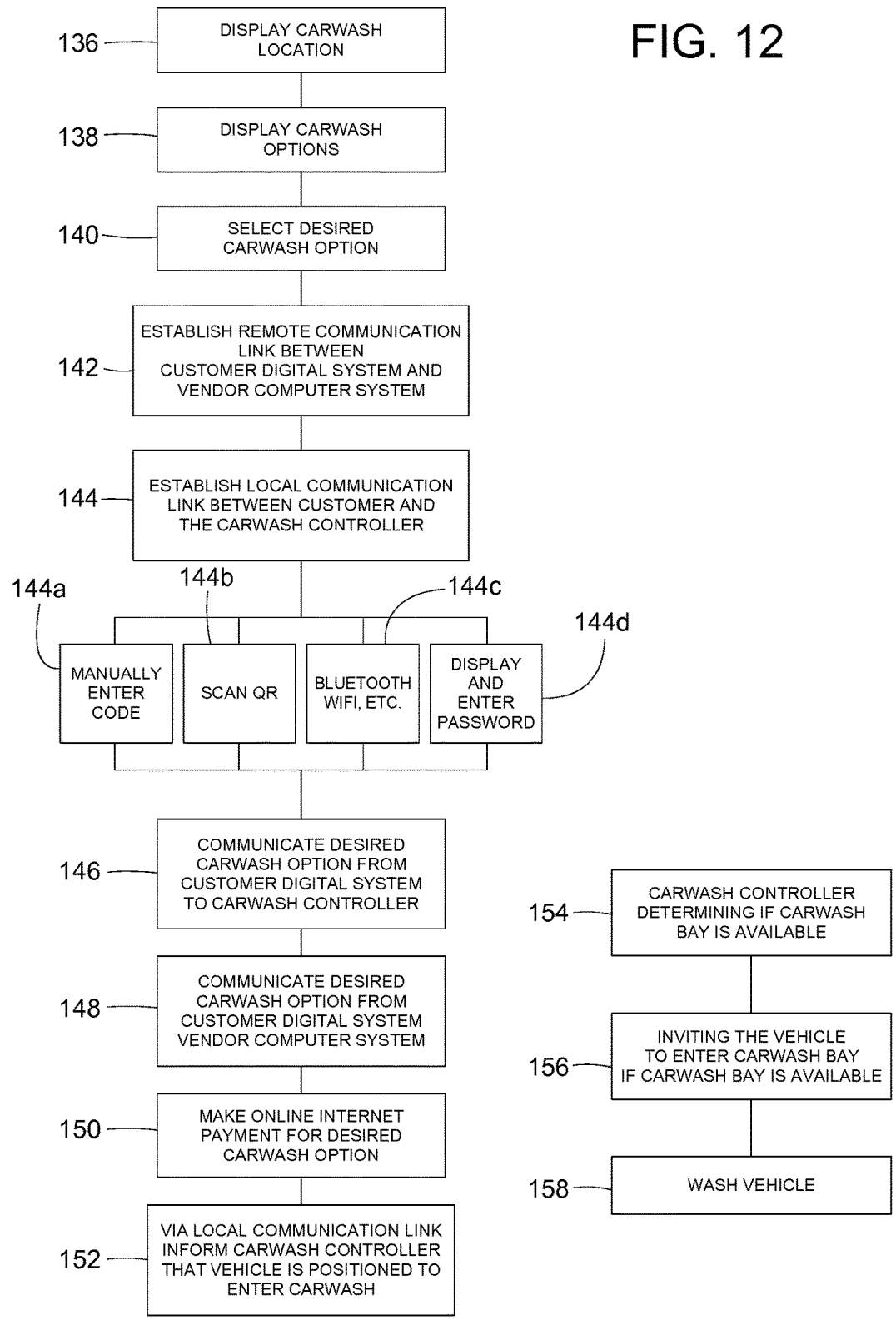

CARWASH WITH SMARTPHONE PROXIMITY DETECTION

CROSS REFERENCE TO RELATED APPLICATIONS

This application is a division of application Ser. No. 13/492,848 filed on Jun. 9, 2012.

FIELD OF THE DISCLOSURE

The subject invention generally pertains to carwashes and more specifically to means for initiating a carwash cycle.

BACKGROUND

Carwashes for automatically washing cars, trucks, trailers and other vehicles typically comprise a carwash apparatus with one or more sprayers for spraying water, soap, wax and various chemical treatments on the vehicle. The sprayer might be part of a spray wand dedicated for spraying, or the sprayer might be combined with brushes or other cleaning equipment. Carwash apparatuses are usually powered and controlled to provide relative movement between the sprayer and the vehicle. The sprayer, for example, might travel along the vehicle's outer perimeter, or the vehicle might travel while the sprayer is stationary, or both the sprayer and the vehicle move.

BRIEF DESCRIPTION OF THE DRAWINGS

FIG. 12 is another block diagram showing various methods that are not necessarily performed sequentially or in the order shown.

DETAILED DESCRIPTION

FIGS. 1-13 illustrate example carwash methods that enable a customer 10 to purchase one or more carwash options online and then use a smartphone with an app to actually start the car washing process. The intention is to encourage patron loyalty to carwash chains or franchises that employ the convenient method.

Figure 1:
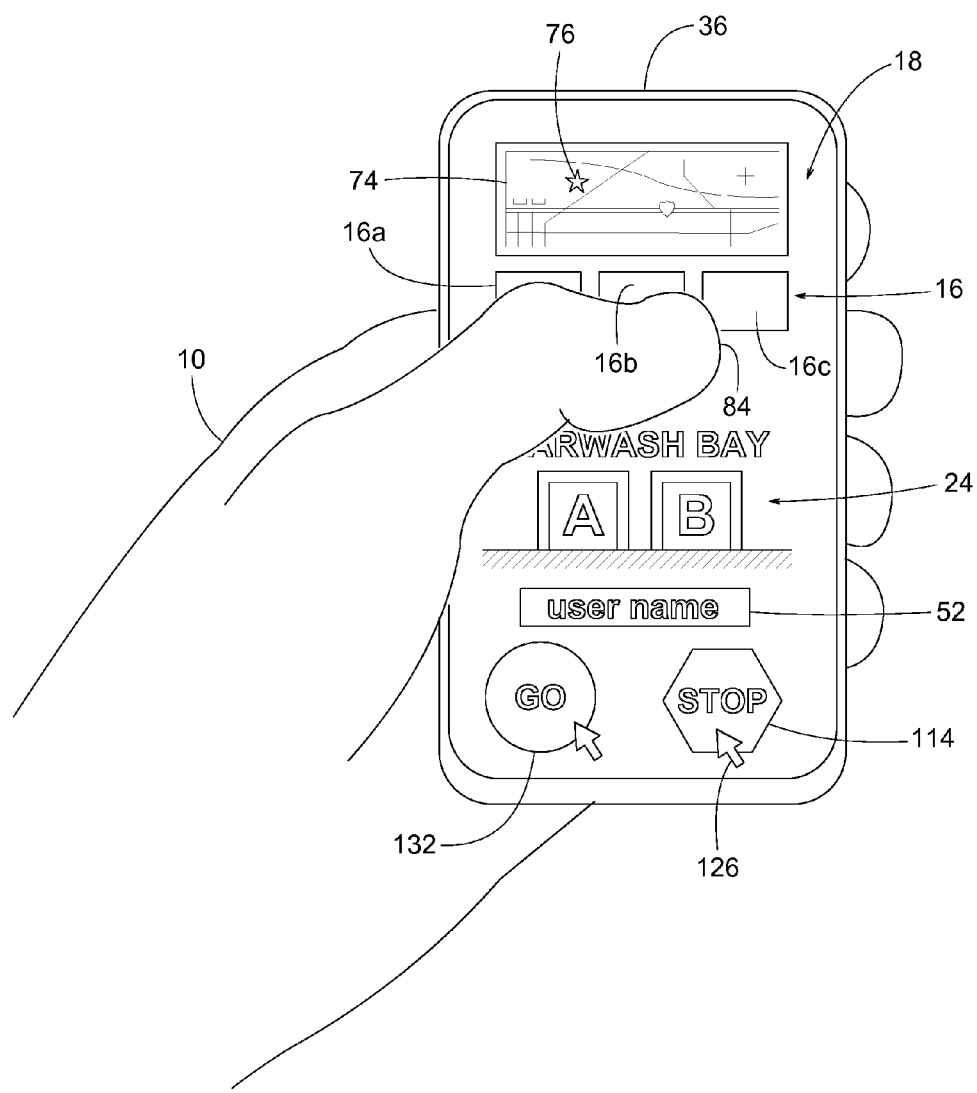
FIG. 1 is a front view of a customer holding an example portable digital device used in some examples of a carwash method.
Figure 2:
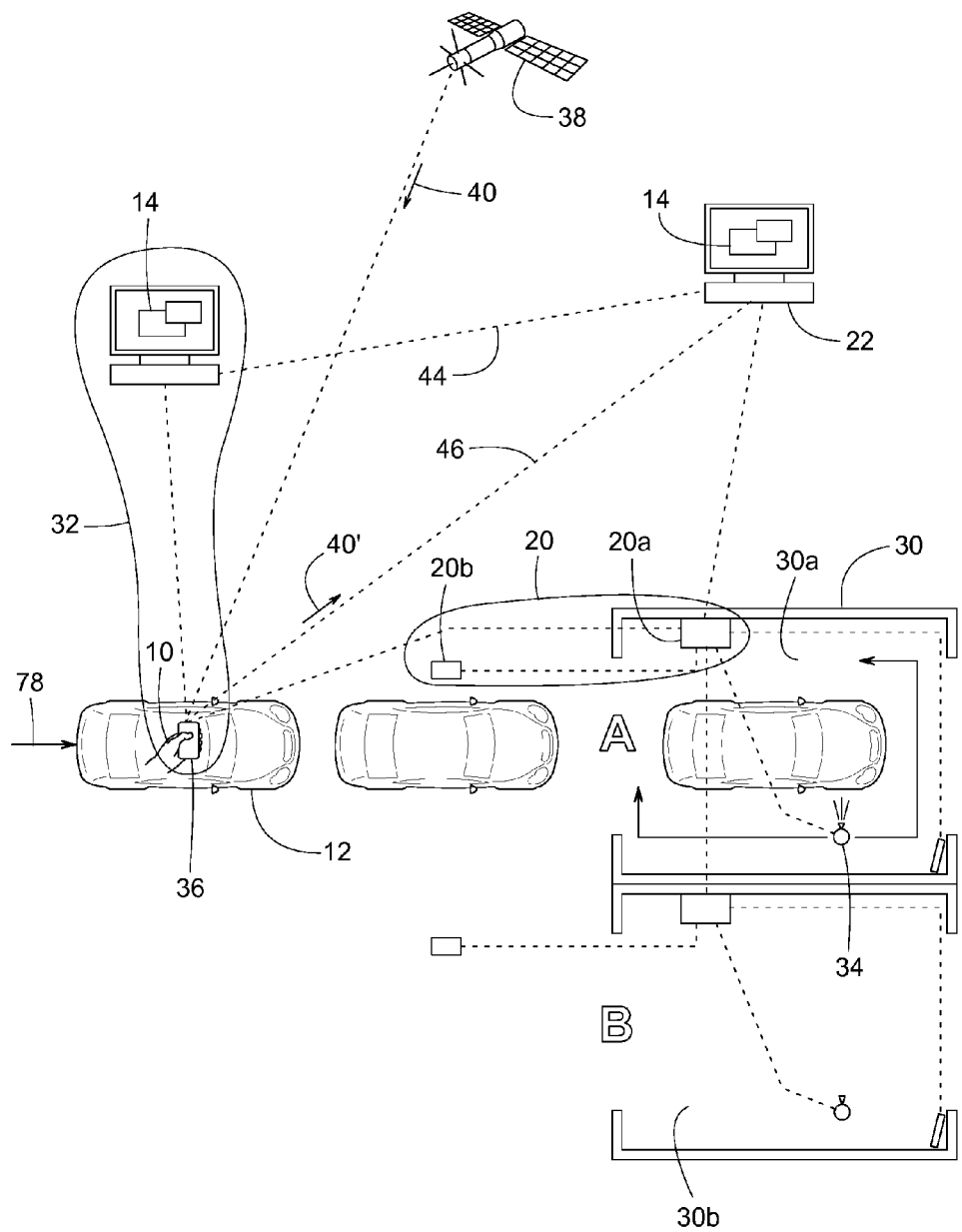
FIG. 2 is a top view showing the customer driving to and subsequently waiting in line for a carwash. Lines of communication are shown as dashed or dotted lines.
Figure 3:
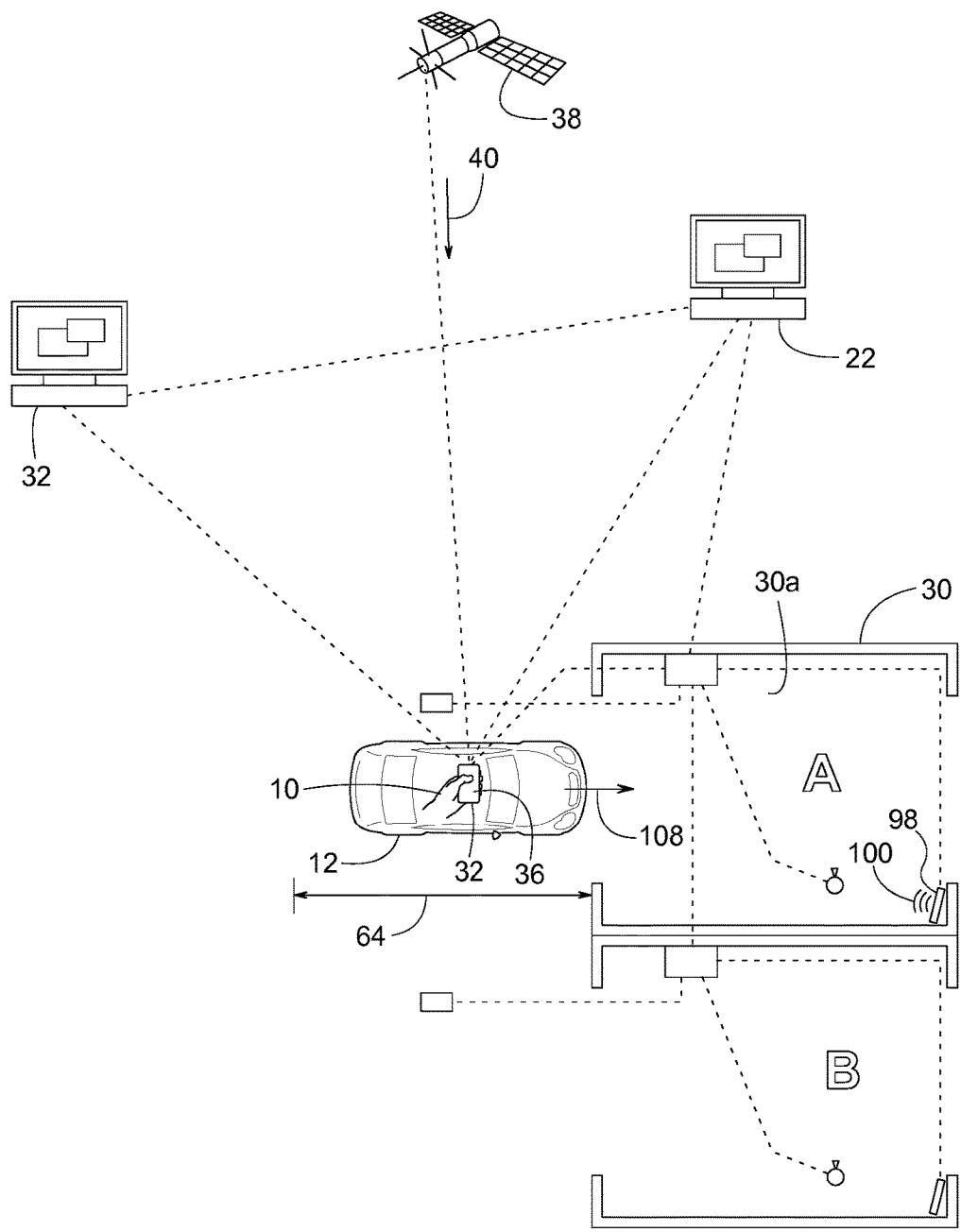
FIG. 3 shows the customer entering a chosen carwash bay.
Figure 4:
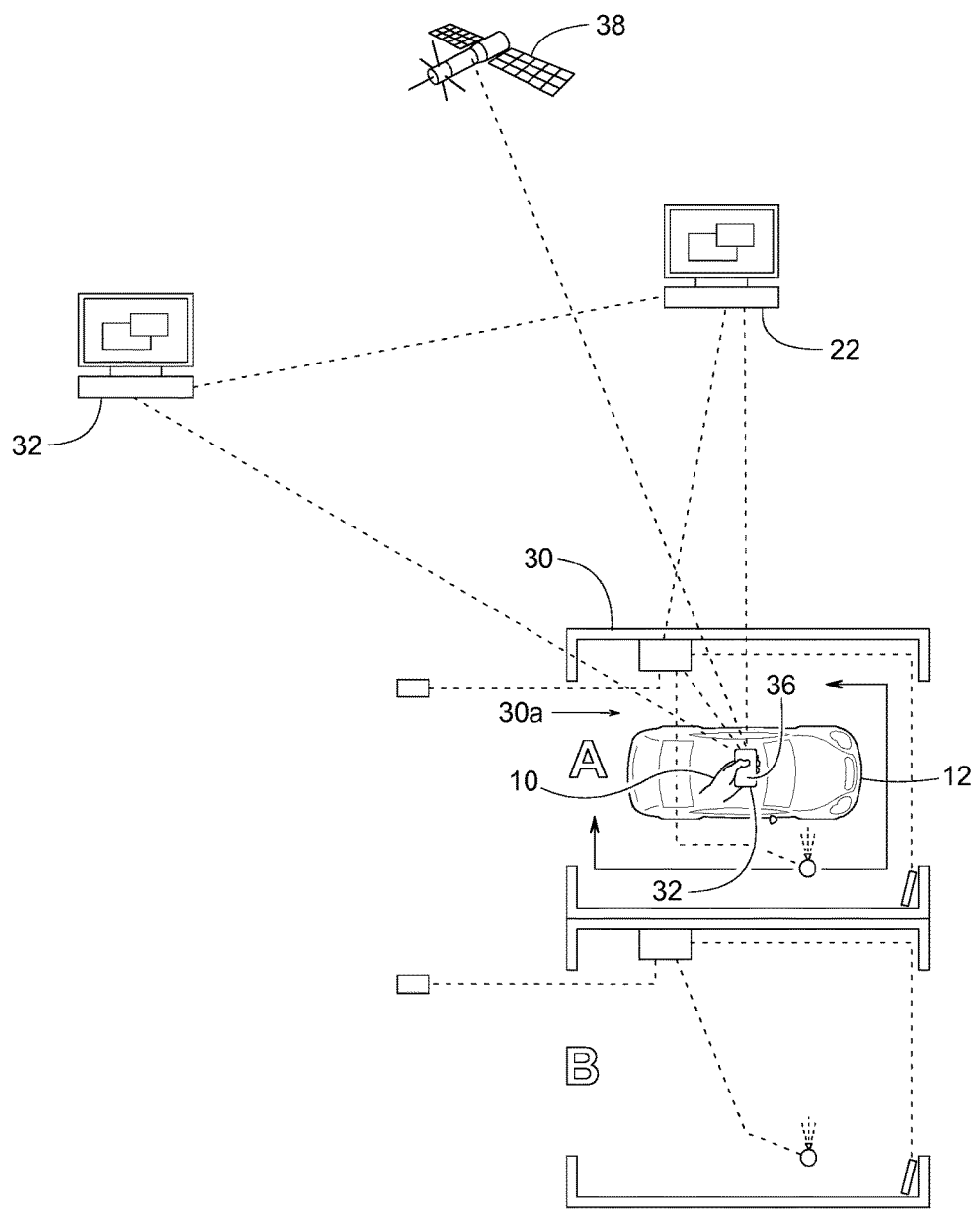
FIG. 4 shows the vehicle being washed.

An example of the method might proceed as follows. A customer 10 uses a home computer or smartphone (FIG. 1) to access a carwash franchise website 14. By way of the website, customer 10 enters a user name, e.g., DRIVER, and makes an online payment for three carwashes, e.g., two standard washes and one deluxe wash. At some later period while traveling in a vehicle 12, customer 10 uses his smartphone to find the nearest participating carwash. Customer 10 then drives vehicle 12 to the carwash. Upon arriving at the carwash, customer 10 decides to wait in line for carwash bay-A (FIG. 2). Customer 10 then uses his smartphone to announce he's at the carwash and that he wants the deluxe wash (FIG. 2). In some examples, customer 10 might use icons 16 on the smartphone to inform the carwash that in this instance he would like the deluxe wash. A carwash controller 20 and/or vendor computer system 22 identifies the customer upon recognizing his password, DRIVER. Based on a GPS reading from the smartphone, carwash controller 20 and/or vendor computer system 22 determines whether vehicle 12 is at the entrance of carwash bay-A (FIG. 3). Otherwise, in some examples, customer 10 might use icons 24 on his smartphone (FIG. 1) to tell the carwash he's in the line leading to bay-A. If vehicle 12 is at the entrance of carwash bay-A, and bay-A is available to receive vehicle 12 (FIG. 3), then carwash controller 20 and/or vendor computer system 22 invites customer 10 to enter the carwash bay. Customer 10 drives in and the car washing is performed (FIG. 4).

Figure 5:
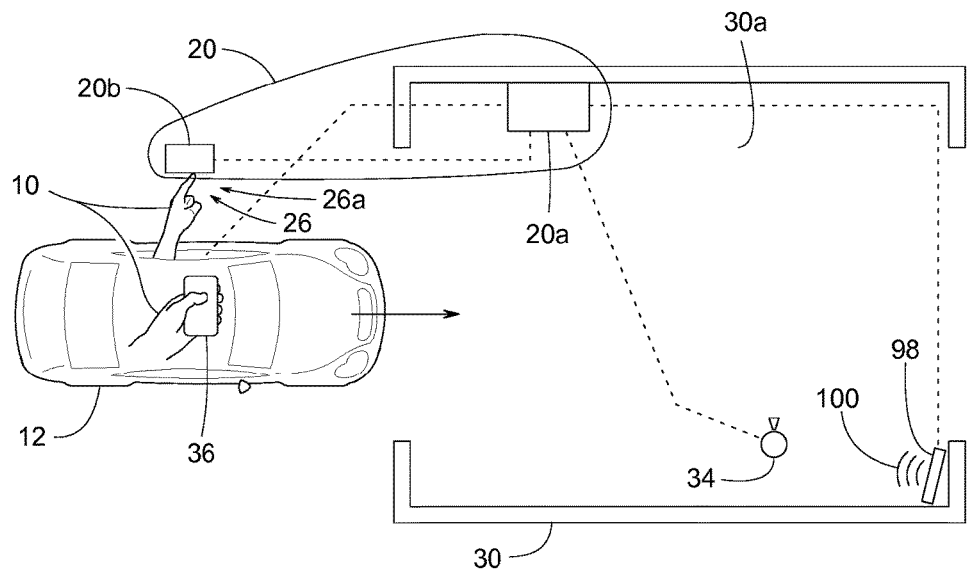
FIG. 5 shows an example local communication link between the customer and an example carwash controller.
Figure 6:
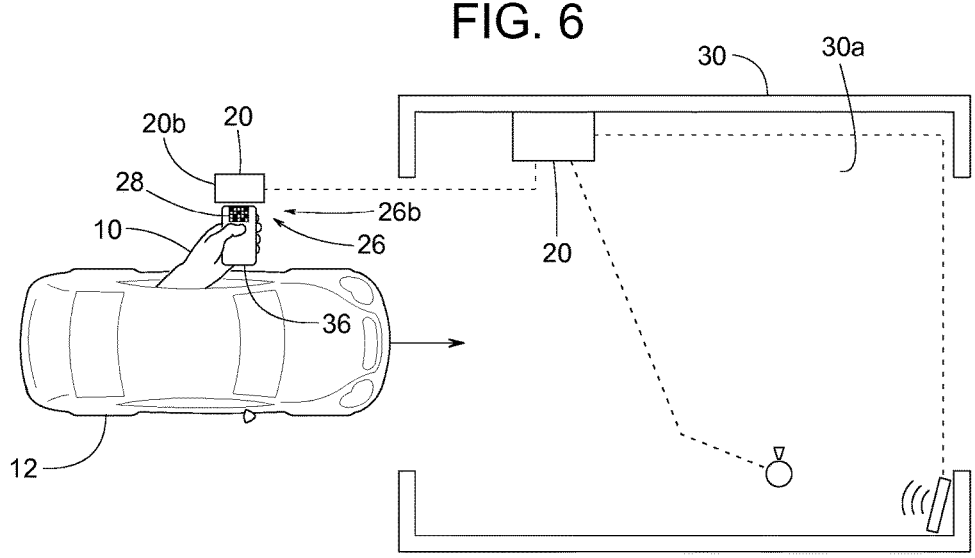
FIG. 6 shows another example local communication link between the customer and an example carwash controller.
Figure 7:
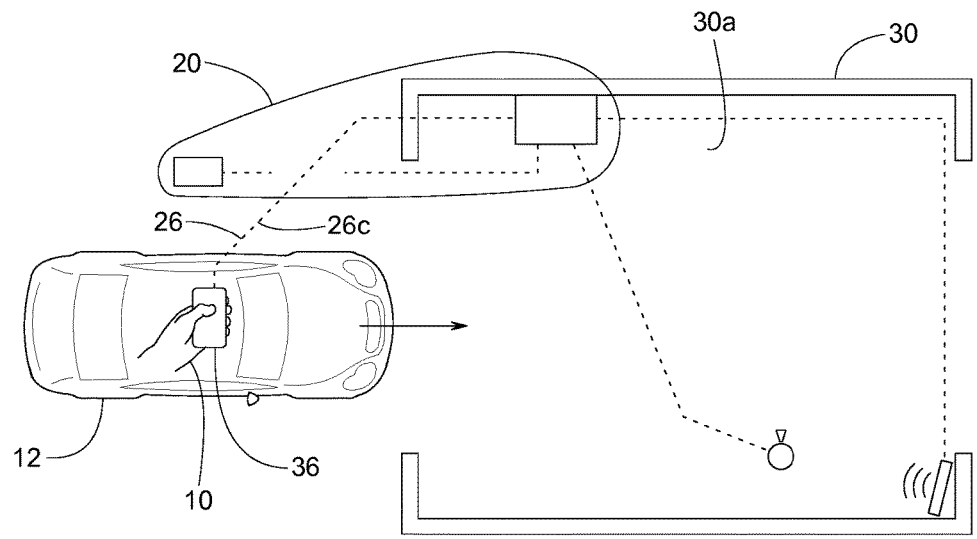
FIG. 7 shows another example local communication link between the customer and an example carwash controller.
Figure 8:
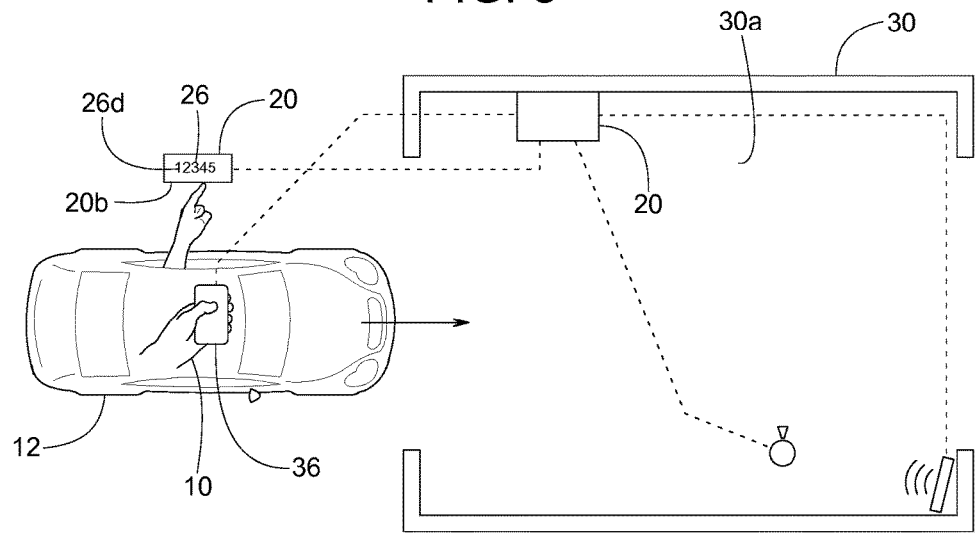
FIG. 8 shows another example local communication link between the customer and an example carwash controller.

In addition and/or as alternatives to using GPS, FIGS. 5-8 show other means for determining whether vehicle 12 is at the entrance of carwash bay-A or within 1.5 car lengths of the entrance (e.g., within about twenty feet). FIG. 5 shows customer 10 manually entering 26a some sort of input (e.g., pressing a pushbutton) to carwash controller 20, FIG. 6 shows carwash controller 20 scanning 26b a QR code 28 (Quick Response Code, which is a registered trademark of Denso Wave, Inc.) displayed on the customer's smartphone, FIG. 7 shows a limited distance wireless communication link 26c (Bluetooth, WiFi, etc.) being established between carwash controller 20 and the customer's smartphone, and FIG. 8 shows carwash controller 20 locally displaying 26d a code that customer 10 first reads and then confirms/repeats by entering the code into his smartphone or inputs into carwash controller 20. Reference numbers 26a, 26b, 26c and 26d each are examples of a local communication link 26.

In some example carwash methods, the method involves the use of one or more of the following: vehicle 12, a carwash 30 with a first carwash bay 30a and sometimes a second carwash bay 30b, carwash controller 20, vendor computer system 22, and a customer digital system 32. The term, "vehicle" means any apparatus with wheels for traveling. Examples of vehicle 12 include, but are not limited to, a car, truck, bus, van, trailer, etc. The terms, "carwash" and "carwash bay" refer to any facility or designated area with at least one sprayer 34 for automatically washing vehicle 12, wherein there is relative machine-controlled movement between sprayer 34 and vehicle 12 as vehicle 12 is being washed.

The term, "carwash controller" refers to one or more electrical circuits for commanding, regulating, monitoring and/or controlling the operation of sprayer 34 and associated carwash equipment. Examples of carwash controller 20 include, but are not limited to, a computer, a microprocessor, an electrical circuit, one or more motor drive units, a programmable logic controller, and various combinations thereof. Examples of "associated carwash equipment" include, but are not limited to, a motor, trolley, pump, door operator, indicator lights, lighted displays, sensors, solenoid valves, etc. In some examples, carwash controller 20 includes a main control unit 20*a* controlling the operation of sprayer 34 and a user interface unit 20*b* (e.g., keyboard, digital display, speaker, microphone, QR scanner, card reader, and various combinations thereof, etc.) for facilitating some communication between customer 10 and main control unit 20*a*. In some examples, units 20*a* and 20*b* are combined in a single unit.

Vendor computer system 22 is schematically illustrated to represent any electronic means for receiving, transmitting and processing digital data. Examples of vendor computer system 22 include, but are not limited to, a desktop computer, laptop computer, web server, etc.

Customer digital system 32 is schematically illustrated to represent any electronic means for receiving, transmitting and processing digital data. Examples of customer digital system 32 include, but are not limited to, a desktop computer, home computer, laptop computer, a portable digital device 36, touchpad tablet, GPS navigation system, and various combinations thereof. Portable digital device 36 is schematically illustrated to represent any portable electronic means for receiving, transmitting and processing digital data. Examples of portable digital device 36 include, but are not limited to, a cell phone, smartphone, iPad, touchpad tablet, GPS navigation system (e.g., Garmin, Magellan, Tomtom, etc.). In some examples, portable digital device 36 in the form of a cell phone, smartphone or touchpad tablet, includes an integral GPS receiver in communication with a satellite system 38 for acquiring one or more GPS coordinates 40 or location signals that identify the location of portable digital device 36. In some examples, portable digital device 36 has Internet access or communication via an Android operating system, wherein ANDROID is a registered trademark of Google Inc., of Mountain View, Calif. IPAD is a registered trademark of Apple Inc., of Cupertino, Calif.

Figure 9:
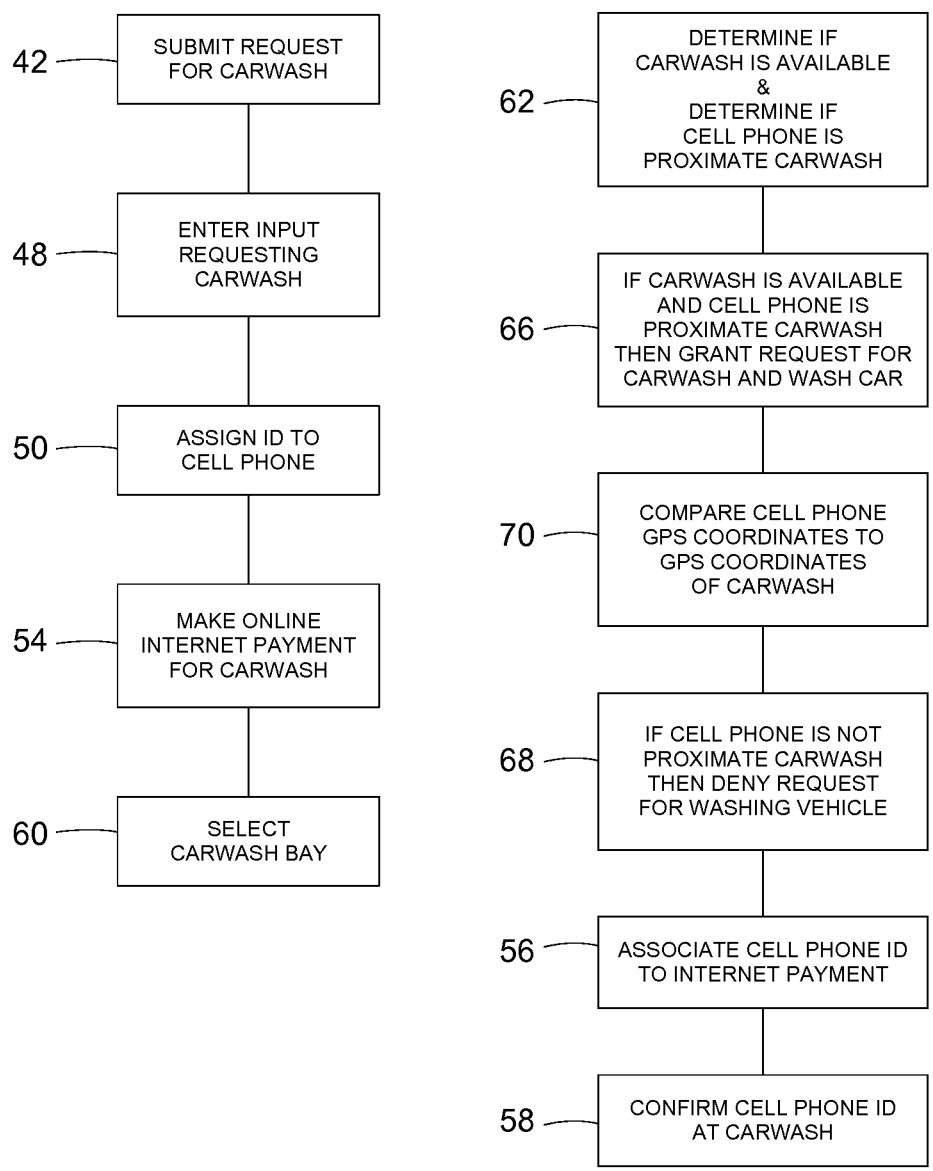
FIG. 9 is a block diagram showing various methods that are not necessarily performed sequentially or in the order shown.

One example carwash method is illustrated in FIG. 9, wherein block 42 represents customer 10 submitting a request for one or more carwash operations (e.g., low cost standard wash, premium wash, deluxe wash, etc.) at carwash 30. The request can be submitted in various ways including, but not limited to, customer 10 using customer digital system 32 (e.g., a desktop computer, smartphone, etc.) in communicating over the Internet via a wireless remote communication link 44 and/or 46 with carwash website 14 posted by vendor computer system 22. For example, block 48 represents customer 10 requesting a carwash operation by entering an input (e.g., mouse-clicking on low cost standard wash icon 16*a*, premium wash icon 16*b*, deluxe wash icon 16*c*, etc.) to portable digital device 36, wherein customer 10 can carry portable digital device 36 in vehicle 12.

Still referring to the example of FIG. 9, block 50 represents customer 10 or website 14 assigning an identity 52 (user name, password, etc.) to portable digital device 36, and conveying/communicating identity 52 to website 14. Block 54 represents customer 10 using customer digital system 36 for making an online Internet payment (credit card, PayPal, etc.) that covers the cost of the one or more requested carwash operations. Block 56 represents website 14 associating identity 52 to the online Internet payment so that at least one of vendor computer system 22 and carwash controller 20 knows that the customer with portable digital device 36 has paid for a carwash operation. Vendor computer system 22 and/or carwash controller 20 later uses this information in confirming the identity of portable digital device 36 at the carwash, as illustrated by block 58.

Still referring to FIG. 9, upon approaching carwash 30 or at some point prior to entering carwash 30, customer 10 selects a desired carwash bay (e.g., bay 30*a* or 30*b*) if carwash 30 has more than one carwash bay. Customer 10, for example, might select whichever carwash bay has the shortest line of cars. Block 60 represents customer 10 selecting via portable digital device 36 carwash bay 30*a* or 30*b* from a plurality of carwash bays, thereby telling carwash controller 20 which bay vehicle 12 intends to enter. In some examples, customer 10 selects bay 30*a* or 30*b* and informs carwash controller 20 of the choice by clicking on one of a plurality of icons 24.

Still referring to FIG. 9, block 62 represents vendor computer system 22 and/or carwash controller 20 determining whether the chosen carwash bay 30*a* is available to receive a vehicle for the carwash operation. Block 62 also represents vendor computer system 22 and/or carwash controller 20 determining whether portable digital device 36 in vehicle 12 is within a predetermined distance 64 (FIG. 3) of the entrance of carwash 30. In some examples, predetermined distance 64 is about 1.5 car lengths or about twenty feet. In some examples, determining whether portable digital device 36 is within distance 64 is achieved by vendor computer system 22 and/or carwash controller 20 considering the GPS coordinates 40 of portable digital device 36, as illustrated by block 70. If portable digital device 36 is within distance 64 and the carwash is available for the carwash operation, then vendor computer system 22 and/or carwash controller 20 allows the carwash operation request, and carwash 30 performs the chosen carwash operation on vehicle 12, as illustrated by block 66. If, however, portable digital device 36 is beyond distance 64, vendor computer system 22 and/or carwash controller 20 disallows the carwash request and inhibits the carwash operation, as illustrated by block 68.

Figure 10:
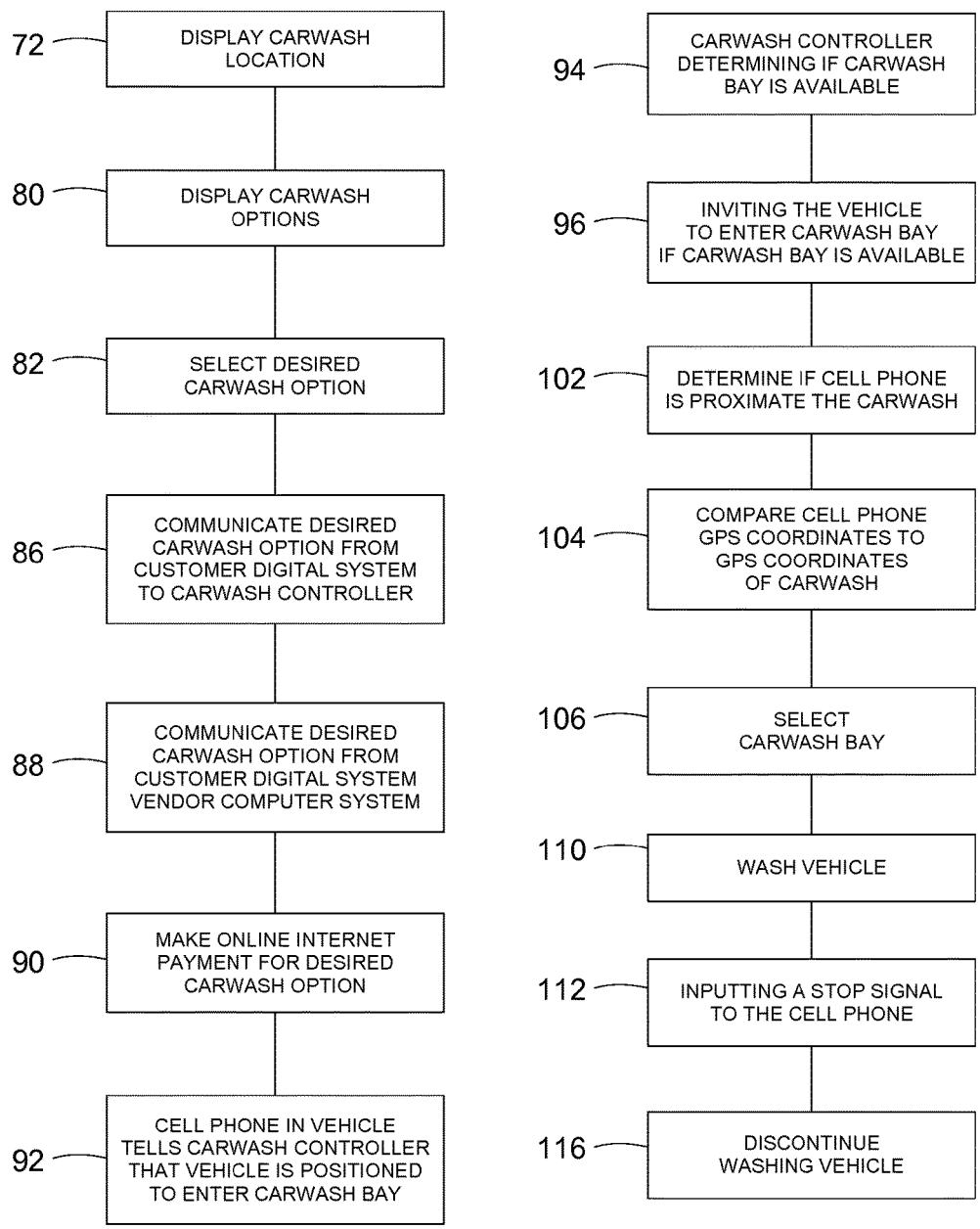
FIG. 10 is another block diagram showing various methods that are not necessarily performed sequentially or in the order shown.

Another example carwash method is illustrated in FIG. 10, wherein block 72 and image 74 (FIG. 1) represents displaying a carwash location 76 of carwash 30 on customer digital system 32. Arrow 78 of FIG. 2 illustrates driving vehicle 12 to the carwash location. Block 80 of FIG. 10 and icons 16 of FIG. 1 represent displaying a plurality of carwash options on customer digital system 36. In some examples, icons 16 for carwash options are displayed concurrently. In some examples, icons 16 for carwash options are display sequentially. Block 82 of FIG. 10 and a thumb 84 of FIG. 1 represents selecting a desired carwash option 16*a*, 16*b* and/or 16*c* from the plurality of carwash options 16. Block 86 represents communicating the desired carwash option from customer digital system 36 to carwash controller 20, and block 88 represents communicating the desired carwash option from customer digital system 36 to vendor computer system 22. In some examples, such communications are facilitated via the Internet, Bluetooth, WiFi, and/or combinations thereof. WI-FI is a trademark of Wi-Fi Alliance, and BLUETOOTH is a trademark of Bluetooth SIG.

Still referring to FIG. 10, block 90 represents making an online Internet payment for the desired carwash option. Block 92 represents portable digital device 36 informing carwash controller 20 (informing directly or via vendor computer system 22) that vehicle 12 is in position to enter carwash bay 30*a*. Block 94 represents carwash controller 20 determining whether carwash bay 30*a* is available to receive vehicle 12. If carwash controller 20 determines that carwash bay 30*a* is available to receive vehicle 12, then subsequent to portable digital device 36 in vehicle 12 informing carwash controller 20 that vehicle 12 is in position to enter carwash bay 30a, at least one of vendor computer system 22 and carwash controller 20 invites vehicle 12 to enter carwash bay 30a, as illustrated by block 96. Examples of such invitation to enter carwash bay 30a include, but are not limited to, an indicator 98 (e.g., a sign and/or speaker) providing an invitation message 100 (e.g., audio or visual), and/or an audio or visual invitation message emitted from portable digital device 36. Example invitation messages include, but are not limited to, the following: "You may enter the carwash now" or "You may enter the carwash when you are ready."

Still referring to FIG. 10, in some example methods, block 102 represents at least one of vendor computer system 22, carwash controller 20 and customer digital system 32 determining whether portable digital device 36 is proximate carwash 30 (e.g., within distance 64). Examples of determining whether portable digital device 36 is proximate carwash 30 include, but are not limited to, customer 10 simply using portable digital device 36 to tell vendor computer system 22 and/or carwash controller 20 that vehicle 12 is in a proximate position to enter carwash bay 30a, a GPS reading 40' of portable digital device 36 being conveyed to vendor computer system 22 and/or carwash controller 20 (as represented by block 104 of FIG. 10), and any of the various means illustrated in FIGS. 5-8. Block 106 represents customer 10 selecting via portable digital device 36 carwash bay 30a or 30b from a plurality of carwash bays, thereby telling carwash controller 20 which bay vehicle 12 intends to enter. In some examples, customer 10 selects bay 30a or 30b and informs carwash controller 20 of the choice by clicking on one of the plurality of icons 24. Arrow 108 of FIG. 3 illustrates vehicle 12 entering carwash bay 30a. Block 110 represents performing the carwash operation according to the desired carwash option, wherein the carwash operation includes washing vehicle 12.

Still referring to FIG. 10, in the event of an emergency while washing vehicle 12, block 112 represents customer 10 inputting a stop signal 114 (FIG. 1) to portable digital device 36, wherein stop signal 114 is conveyed to carwash controller 20 via the Internet, Bluetooth, WiFi or some other wireless communication link. Block 116 represents carwash controller 20 discontinuing washing of vehicle 12 in response to stop signal 114. Examples of such an emergency include, but are not limited to, sprayer 34 striking or scraping against vehicle 12, a window of vehicle 12 being stuck open, a child suddenly opening a door or window of vehicle 12, customer 10 suddenly recalling that cargo is on the exterior of vehicle 12, the customer realizing the vehicle's side mirrors or antenna are not retracted, the customer noticing that the vehicle's gas cap is missing, sprayer 34 failing to ever stop, etc.

Figure 11:
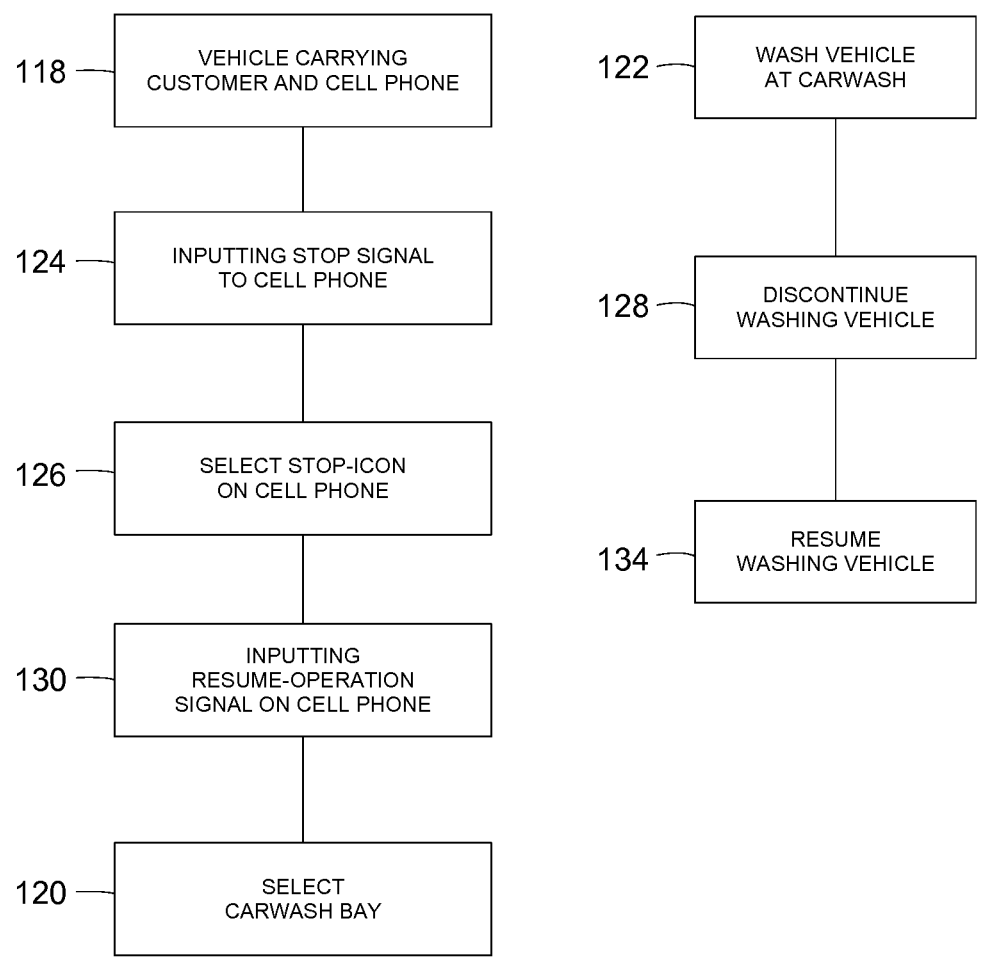
FIG. 11 is another block diagram showing various methods that are not necessarily performed sequentially or in the order shown.

Another example carwash method is illustrated in FIG. 11, wherein block 118 of FIG. 11 plus FIGS. 2-8 illustrate carrying customer 10 and portable digital device 36 within vehicle 12. Block 120 represents selecting via portable digital device 36 a carwash bay from a plurality of carwash bays at carwash 30. Block 122 of FIG. 11 plus FIG. 4 illustrate washing vehicle 12 at carwash 30. Block 124 represents customer 10 inputting stop signal 114 (FIG. 1) to portable digital device 36. Block 126 represents inputting stop signal 114 by selecting 126 a stop icon (stop signal 114) on portable digital device 36. Block 128 represents discontinuing washing vehicle 12 in response to customer 10 inputting stop signal 114 to portable digital device 36. Block 130 represents customer 10 inputting a resume-operation signal 132 (FIG. 1) to portable digital device 36. Block 134 represents resuming washing vehicle 12 in response to customer 10 inputting resume-operation signal 132 to portable digital device 36.

Another example carwash method is illustrated in FIG. 12, wherein block 136 represents displaying on customer digital system 32 a representation (e.g., a map image 74 and/or text address) of carwash location 76, wherein customer digital system 32 includes portable digital device 36 that customer 10 has in vehicle 12. Arrow 78 of FIG. 2 illustrates driving vehicle 12 to carwash location 76. Block 138 represents displaying a plurality of carwash options 16 on customer digital system 36. Block 140 illustrates selecting a desired carwash option from the plurality of carwash options 16, wherein selecting the desired carwash option involves customer digital system 36. Block 142 represents establishing a remote communication link 44 and/or 46 (FIG. 2) between customer digital system 32 and vendor computer system 22. The term, "remote" means a communication link that can extend more than 10 miles via known means such as cell phone towers, WiFi, Bluetooth, cable, satellite, and various combinations thereof, etc.

Still referring to FIG. 12, block 144 represents establishing local communication link 26 between customer 10 and carwash controller 20, wherein local communication link 26 is shorter than remote communication links 44 and 46. In other words, the term, "local" means local communication link 26 extends a shorter distance than remote communication links 44 and 46. Examples of local communication link 26 includes, but are not limited to, customer 10 manually entering some sort of input (e.g., pressing a pushbutton) to carwash controller 20 (block 144a and local communication link 26a of FIG. 5), carwash controller 20 scanning QR code 28 displayed on portable digital device 36 (block 144b and local communication link 26b of FIG. 6), a limited distance wireless communication link, such as Bluetooth, WiFi, etc., being established between carwash controller 20 and portable digital device 36 (block 144c and local communication link 26c of FIG. 7), and carwash controller 20 locally displaying a password or code (e.g., alphanumeric) that customer 10 first reads and then confirms/repeats by entering the password or code into portable digital device 36 or inputs into carwash controller 20 (block 144d and local communication link 26d of FIG. 8).

Still referring to FIG. 12, block 146 represents communicating the desired carwash option 16 from customer digital system 32 to carwash controller 20 using at least one of remote communication links 44 and 46 and local communication link 26. Block 148 represents communicating the desired carwash option 16 from customer digital system 32 to vendor computer system 22 using at least one of remote communication links 44 and 46 and local communication link 26. Block 150 represents making an online Internet payment for the desired carwash option 16, wherein the online Internet payment involves customer digital system 32, vendor computer system 22 and remote communication link 44 and/or 46. Block 152 represents informing carwash controller 20 via local communication link 26 that vehicle 12 is in position to enter carwash bay 30a. Block 154 represents carwash controller 20 determining whether carwash bay 30a is available to receive vehicle 12. If carwash controller 20 determines that carwash bay 30a is available to receive vehicle 12, then subsequent to carwash controller 20 being informed that vehicle 12 is in position to enter carwash bay 30a, at least one of vendor computer system 22 and carwash controller 20 inviting vehicle 12 to enter carwash bay 30a, as illustrated by block 156. Block 158 represents carwash 30 performing the carwash operation according to the chosen desired carwash option, wherein the carwash operation includes washing vehicle 12.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A carwash method for washing a vehicle for a customer at a carwash that includes a plurality of carwash bays, wherein the customer has a customer digital system that includes a portable digital device in the vehicle, and the carwash method involves the use of at least one of a vendor computer system and a carwash controller, the carwash method comprising:

displaying a plurality of carwash options on the customer digital system;

using the customer digital system submitting a request for a carwash operation;

making an online internet payment using the customer digital system that covers a cost of the carwash operation, assigning an identity to the portable digital device and associating the identity with the online internet payment;

selecting via the portable digital device a carwash bay of the plurality of carwash bays by transmitting a selection to at least one of the carwash controller and the vendor computer system;

confirming the identity of the portable digital device at the carwash;

determining by at least one of the vendor computer system and the carwash controller whether the carwash is available for the carwash operation and at least one of the vendor computer system and the carwash controller determining that the portable digital device in the vehicle is within a predetermined distance of the carwash; and transmitting an invitation by at least one the vendor computer system and the carwash controller wherein the invitation includes at least one of an audio invitation message and a visual invitation message, emitted from the portable digital device, allowing the request and the carwash subsequently performing the carwash operation on the vehicle.

2. The carwash method of claim 1, wherein submitting the request for the carwash operation at the carwash is performed by the customer entering an input to the portable digital device that the customer has in the vehicle, and the portable digital device is Internet accessible.

3. The carwash method of claim 1, wherein determining whether the portable digital device is within a predetermined distance of the carwash involves considering at least one GPS coordinate.

4. The carwash method of claim 1, wherein determining whether the portable digital device is within a predetermined distance of the carwash involves a WiFi limited distance wireless communication link.

5. The carwash method of claim 4, wherein the WiFi limited distance wireless communication link extends between the carwash controller and the portable digital device when the portable digital device is within the predetermined distance.

6. The carwash method of claim 4, wherein the predetermined distance is greater than the WiFi limited distance wireless communication link when the portable digital device is beyond the predetermined distance from the carwash controller.

* * * * *